United States Patent
Yoon et al.

(10) Patent No.: US 7,903,953 B2
(45) Date of Patent: Mar. 8, 2011

(54) IMAGE RECORDING AND REPRODUCING APPARATUS AND METHOD

(75) Inventors: Kyoung Ro Yoon, Seoul (KR); Bae Geun Kang, Sungnam-si (KR); Sung Bae Jun, Seoul (KR)

(73) Assignee: LG Electronics, Inc., Seoul (KR)

( * ) Notice: Subject to any disclaimer, the term of this patent is extended or adjusted under 35 U.S.C. 154(b) by 970 days.

(21) Appl. No.: 10/814,198

(22) Filed: Apr. 1, 2004

(65) Prior Publication Data
US 2004/0197078 A1 Oct. 7, 2004

(30) Foreign Application Priority Data

Apr. 3, 2003 (KR) .................. 10-2003-0021102

(51) Int. Cl.
*H04N 5/93* (2006.01)
(52) U.S. Cl. ......... 386/353; 386/239; 386/326; 348/564; 348/565; 725/90
(58) Field of Classification Search ............... 386/1, 46, 386/92, 95, 121–122; 348/564, 565
See application file for complete search history.

(56) References Cited

U.S. PATENT DOCUMENTS

| 5,852,474 | A | * | 12/1998 | Nakagaki et al. ............. 348/564 |
| 6,204,886 | B1 | * | 3/2001 | Yoshimura et al. ........... 348/564 |
| 2001/0008427 | A1 | * | 7/2001 | Seo ............................... 348/565 |
| 2002/0057372 | A1 | * | 5/2002 | Cavallerano et al. ......... 348/565 |
| 2002/0174430 | A1 | | 11/2002 | Ellis et al. |
| 2003/0016304 | A1 | * | 1/2003 | Norsworthy et al. ......... 348/565 |
| 2003/0099457 | A1 | * | 5/2003 | Takahashi et al. .............. 386/46 |
| 2003/0108331 | A1 | * | 6/2003 | Plourde et al. ................... 386/83 |
| 2003/0142956 | A1 | | 7/2003 | Tomita et al. |
| 2003/0170003 | A1 | * | 9/2003 | Levesque et al. ............... 386/68 |

FOREIGN PATENT DOCUMENTS

| CN | 1218597 | 6/1999 |
| CN | 1232284 A | 10/1999 |
| CN | 1339783 | 3/2002 |
| EP | 1158791 | 11/2001 |
| EP | 1173015 | 1/2002 |
| EP | 1 255 404 A1 | 11/2002 |
| EP | 1 330 118 A | 7/2003 |
| MX | PA00008659 A | 12/2002 |

* cited by examiner

*Primary Examiner* — Thai Tran
*Assistant Examiner* — Girumsew Wendmagegn
(74) *Attorney, Agent, or Firm* — Birch Stewart Kolasch & Birch, LLP

(57) ABSTRACT

An image recording and reproducing apparatus and method are provided, in which a current broadcasting and a previous broadcasting with respect to one image content can be viewed at the same time using multi-decoding. One embodiment of the apparatus includes mode setup unit for users to select a time shift mode.

2 Claims, 6 Drawing Sheets

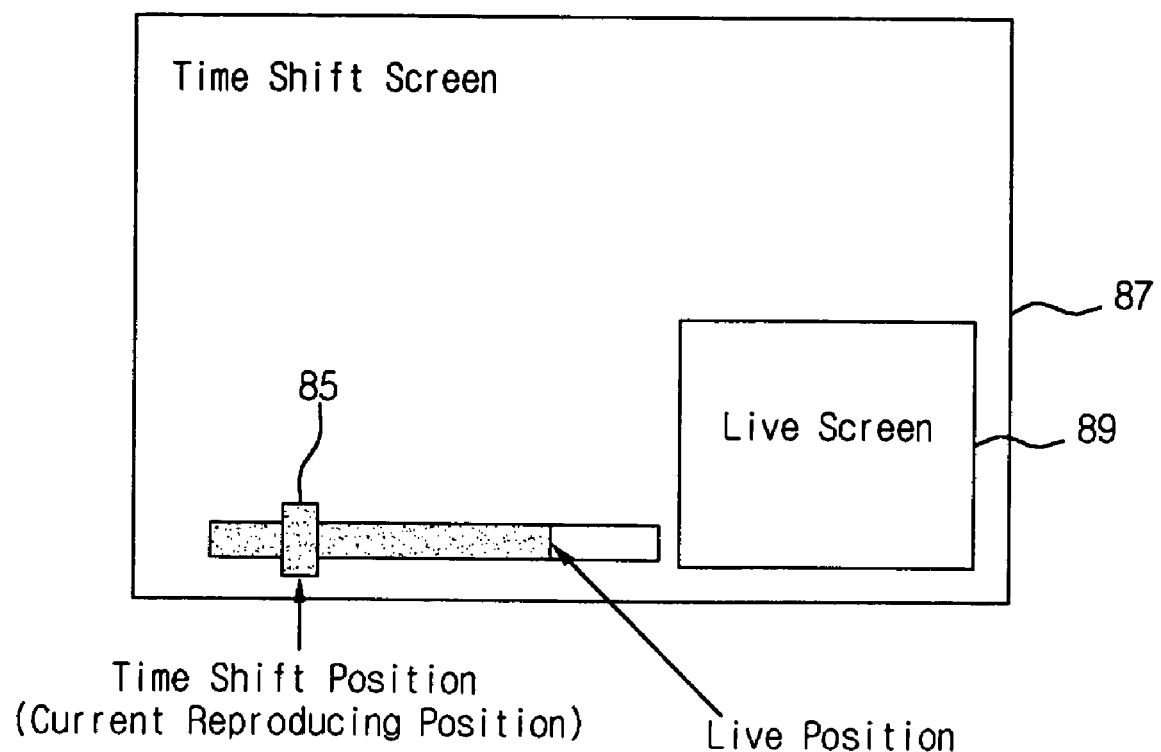

IMAGE RECORDING AND REPRODUCING APPARATUS AND METHOD

This Nonprovisional application claims priority under 35 U.S.C. §119(a) on Patent Application No(s). 10-2003-0021102 filed in Korea on Apr. 3, 2003, the entire contents of which are hereby incorporated by reference.

BACKGROUND OF THE INVENTION

1. Field of the Invention

The present invention relates to an image recording and reproducing apparatus, and more particularly, to an image recording and reproducing apparatus and method, in which a current broadcasting and a previous broadcasting with respect to one image content can be viewed at the same time using multi-decoding.

2. Description of the Related Art

Automatic recording service using program information to individual's taste is based on personal television "ReplayTV" and Personal Versatile Recorder (PVR) produced by TiVo, which is one of leading companies in this field. "ReplayTV"-based service is one of so-called personal televisions. The "ReplayTV"-based service can record television broadcast programs on hard disc device (HDD) in real time, pause or rewind them while viewing programs. In addition, the service can obtain a program list, select programs considering actor or actress, theme and the like, and collect favorite programs to make one's own channel on hard disc drive.

PVR-based service is similar to a conventional video tape recorder (VTR). However, the PVR-based service can record several-hour long programs using a mass storage device (hard disc drive) instead of tape. Since programs can be recorded in real time, PVR user can view broadcasting programs except for advertisements by using the pause and rewind functions. In addition, PVR can select and record dozens kinds of programs in order to view them later.

Such a PVR system includes a tuner, a playback device and a random-accessible hard disc drive and it is an image recording and reproducing apparatus which can provide a user with a live screen stop function, a time shift function, a high speed fast forward function, and the like.

Here, the time shift function is a function that can simultaneously record and reproduce programs using disc buffer, allow the user to switch to a current broadcasting while viewing a previous broadcasting, and provide a trick play to a recorded portion.

Accordingly, the time shift function has an advantage that can freely control a reproduction of a live broadcasting stream like an existing recorded stream.

However, a reproduction of scenes in the time shift is fundamentally different from that of existing recorded contents. In other words, the reproduction of scenes in the time shift means that live scenes are continuously recorded and stored even in the time shift.

When the user views a video in the time shift mode, the user generally wants to view a previous scene again when advertisements or uninteresting scenes are broadcast. For this purpose, if the user requests the previous scene, a reproduction is executed from the previous scene and thus a reproducing position of the video is changed.

Like this, when advertisements or uninteresting scenes are ended and new contents are started while the user is viewing the previous broadcasting, or when interesting scenes that the user wants to view are started, the user wants to switch to the new contents or the interesting scenes even in the time shift.

In case of a general time shift function, however, it is impossible to view a time shifted scene and a current broadcasting scene at the same time. Therefore, it is impossible to swiftly switch to the current broadcasting scene at a desired point of time.

In addition, when the user switches from the time shifted scene to the current broadcasting scene but wants to switch to the time shifted scene again, it is impossible to switch to the previous scene because there is no recording about position of the previous scene.

FIG. 1 is a schematic block diagram of an image recording and reproducing apparatus according to the related art.

Referring to FIG. 1, a mode setup unit 11 determines whether to record a broadcast signal. In other words, a user selects a mode about whether to record a current incoming broadcast signal using a remote controller or the like. For example, when the user selects a live mode, the broadcast signal is inputted as a live signal to a signal selecting unit 15 as it is. Then, the live signal is decoded by a decoding unit 17 and displayed on a display unit 19.

On the other hand, when the user selects a time shift mode, the broadcast signal is branched into a live signal and a time shift signal. The live signal is inputted to the signal selecting unit 15, while the time shift signal is stored in a recording/storing unit 13.

Like this, when the mode setup unit 11 sets a current mode to the time shift mode, the broadcast signal is inputted to the signal selecting unit 15 for its reproduction and stored in the recording/storing unit 13 at the same time.

Meanwhile, in case of the time shift mode, the time shift signal is stored in the recording/storing unit 13 and again inputted to the signal selecting unit 15 at the same time.

The signal selecting unit 15 selects one of the live signal and the time shift signal and transmits the selected signal to the decoding unit 17. At this time, the user can select one of the live signal and the time shift signal. In other words, if the user wants to view a live broadcasting, the live signal is selected and inputted to the decoding unit 17, and if the user wants to view a previous broadcasting, the time shift signal is selected.

Then, the decoding unit 17 decodes the selected signal. The decoded signal is displayed on a screen of a display unit 19.

In other words, if the signal selecting unit 15 selects the live signal, the current broadcasting scene is displayed, and if the signal selecting unit 15 selects the time shift signal, the previous broadcasting scene is displayed. Here, the previous broadcasting is a stream that is recorded continuously together with the current broadcasting. Also, the previous broadcasting is a term indicating a previous portion of the current broadcasting in a stream that recorded continuously together with the current broadcasting in a state that the user requests the time shift and the time shift stop command is not issued. In other words, the previous broadcasting means a portion prior to the live position in the time shift stream, that is, a portion that is recorded before the live position and stored in a storage unit.

In case of the time shift mode, such a conventional image recording and reproducing apparatus constructed as above displays only the selected signal (that is, one of the live signal and the time shift signal) on the screen.

Accordingly, the user cannot view the current broadcasting and the previous broadcasting at the same time. In other words, in case of switching to the previous broadcasting while uninteresting scenes are displayed in the current broadcasting, the previous broadcasting alone is displayed on the screen. Therefore, the user cannot obtain any information about whether new program is started, whether the uninteresting scenes are yet displayed, or whether interesting scenes are displayed.

As a result, the user cannot view well the current broadcasting and the previous broadcasting because the user must frequently switch to the current broadcasting in order to check the status of the current broadcasting. In addition, the user continues to manipulate the remote controller in order to switch between the current broadcasting and the previous broadcasting, thereby causing the user's inconvenience.

Meanwhile, when the user switches from the previous broadcasting to the current broadcasting but wants to switch to the previous broadcasting again, it is impossible to switch to the previously stopped position because there is no recording about a reproducing end position of the previous broadcasting.

SUMMARY OF THE INVENTION

Accordingly, the present invention is directed to an image recording and reproducing apparatus and method that substantially obviate one or more problems due to limitations and disadvantages of the related art.

An object of the present invention is to provide an image recording and reproducing apparatus, in which a current broadcasting and a previous broadcasting are displayed simultaneously on one screen in a time shift mode by using multi-decoding.

Another object of the present invention is to provide an image recording and reproducing apparatus, in which a reproducing end position of a previous broadcasting is recorded and the previous broadcasting is reproduced from the recorded position in a switch to the previous broadcasting.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image recording and reproducing apparatus comprises: a decoding unit for decoding a live signal and a time shift signal in a time shift mode, the live signal and the time shift signal being branched from a broadcast signal; a signal synthesizing unit for synthesizing the decoded live signal and the decoded time shift signal; and a display unit for displaying the synthesized signals.

According to another embodiment of the present invention, an image recording and reproducing apparatus comprises: a mode setup unit for setting a mode of an inputted broadcast signal; a recording/storing unit for selectively storing the broadcasting signal according to the mode set by the mode setup unit; a live decoding unit for decoding a live signal branched in the mode setup unit; a time shift decoding unit for decoding a time shift signal outputted from the recording/storing unit; a signal synthesizing unit for synthesizing the decoded live signal and the decoded time shift signal; and a display unit for displaying the synthesized signals.

In another aspect of the present invention, an image recording and reproducing method comprises the steps of: when a signal is reproduced in a time shift mode, decoding a live signal and a time shift signal through first and second decoding units, respectively, the live signal and the time shift signal being branched from a broadcast signal; synthesizing the decoded live signal and the decoded time shift signal; and displaying the synthesized signals.

According to another embodiment of the present invention, an image recording and reproducing method comprises the steps of: a) when a signal is reproduced in a time shift mode, displaying a time shift signal and a live signal on one screen at the same time in response to a user's request for a reproduction of a previous broadcasting; b) when the user requests a reproduction of a current broadcasting during the reproduction, recording a reproducing end position of the time shift signal; and c) when the user requests a reproduction of a previous broadcasting again, reproducing the previous broadcasting from the recorded reproducing end position of the time shift signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4C illustrate exemplary screens on which a live signal and a time shift signal are displayed simultaneously according to a preferred embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to description about an image recording and reproducing apparatus and method according to the present invention, a conventional TV system capable of displaying several broadcastings on one screen at the same time will be described below.

In conventional TV systems, one screen is split into several sub-screens and broadcast signals received through different channels are displayed on the respective sub-screens. For this purpose, most of the conventional TV systems have Picture In Picture (PIP) function and Picture On Picture (POP) function. In other words, an analog TV system acquires different broadcast channel signals using two or more tuners and displays several broadcast channel signals on one screen. Meanwhile, a digital TV system transmits two or more digital signals at the same time using two or more tuners and two or more decoders to thereby provide two or more broadcast channel signals to a user.

On the contrary, the image recording and reproducing apparatus according to the present invention displays a current broadcasting and a previous broadcasting on one screen at the same time. In other words, in a time shift mode, one broadcast contents is recorded and reproduced at the same time. Live signal and time shift signal are decoded by corresponding decoders and the decoded signals are displayed through a signal synthesis.

That is, the conventional TV system simultaneously provides different broadcast channels on the screen using several tuners and PIP function. However, the TV system according to the present invention simultaneously provides the current broadcasting together with the previous broadcasting on the screen through the signal synthesis, when broadcast contents being received through one tuner are recorded and reproduced in the time shift mode. Accordingly, the concept of the present invention is fundamentally different from the conventional TV system.

In addition, unlike the conventional system, one of streams inputted to a signal synthesizer is a stream inputted from one tuner and another is a stream inputted from a storage unit. This is also fundamentally different from the conventional TV system.

Hereinafter, an image recording and reproducing apparatus according to the present invention will be described in detail with reference to the accompanying drawings.

Figure 1:
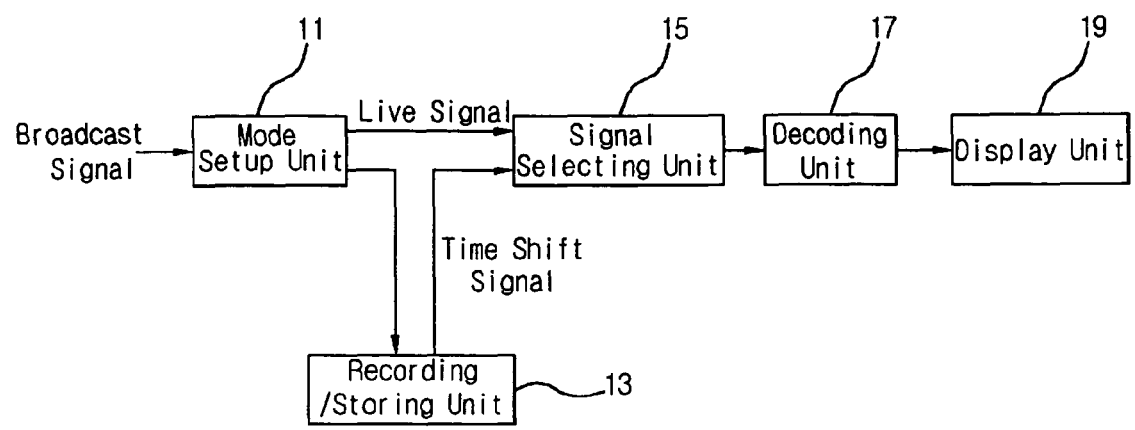
FIG. 1 is a schematic block diagram of an image recording and reproducing apparatus according to the related art.
Figure 2:
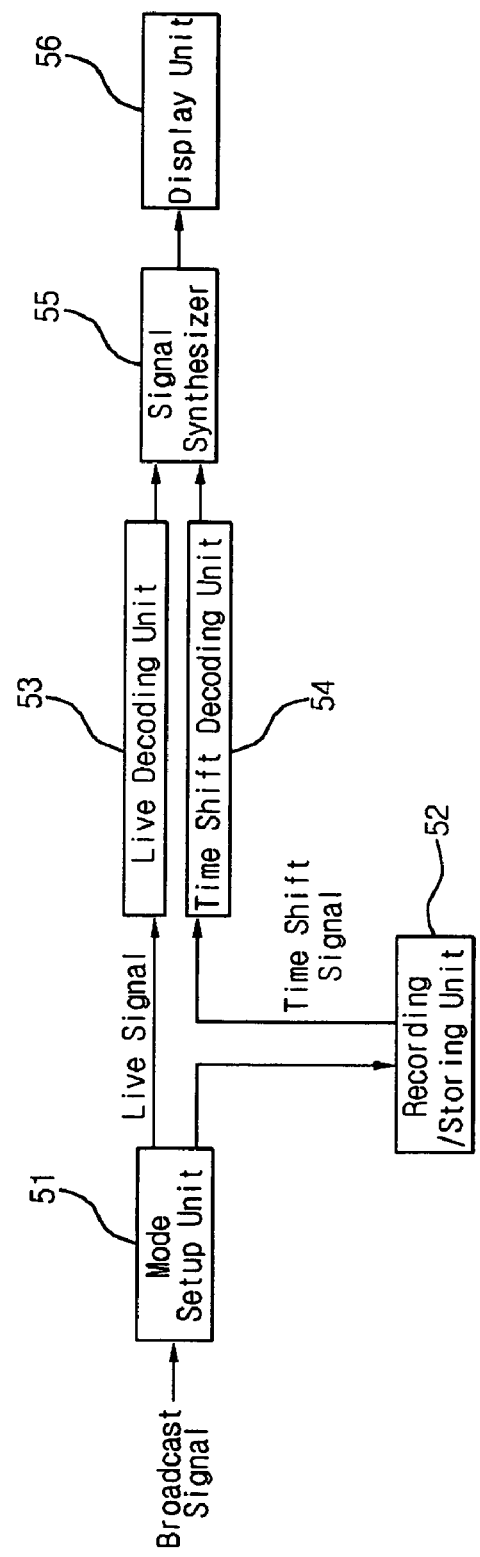
FIG. 2 is a schematic block diagram of an image recording and reproducing apparatus according to a preferred embodiment of the present invention.

FIG. 2 is a schematic block diagram of an image recording and reproducing apparatus according to a preferred embodiment of the present invention.

Referring to FIG. 2, the image recording and reproducing apparatus according to the present invention includes: a mode setup unit 51 for setting a mode of an inputted broadcast signal; a live decoding unit 53 for decoding a live signal that is branched out from the broadcast signal in a time shift mode; a time shift decoding unit 54 for decoding a time shift signal that is branched out from the broadcast signal; a signal synthesizer 55 for synthesizing the decoded live signal and the decoded time shift signal, which are respectively outputted from the live decoding unit 53 and the time shift decoding unit 54; and a display unit 56 for displaying the synthesized signals outputted from the signal synthesizer 55. Here, the broadcast signal is contents that are inputted through one channel. In other words, the broadcast signal is a broadcasting program that is inputted through one tuner.

At this time, the time shift signal is stored in a recording/storing unit 52.

The mode setup unit 51 can allow the user to select one of the live mode and the time shift mode.

When the user selects the live mode, the inputted broadcast signal is processed in the live decoding unit 53 and the signal synthesizer 55 without being recorded, and then, displayed on the display unit 56.

On the other hand, when the user selects the time shift mode, the inputted broadcast signal is recorded and reproduced at the same time. In other words, if the user sets the time shift mode through the node setup unit 51, the broadcast signal is branched into the live signal and the time shift signal. The live signal and the time shift signal are inputted to the live decoding unit 53 and the recording/storing unit 52, respectively.

The live signal is decoded by the live decoding unit 53 and then inputted to the signal synthesizer 55.

Meanwhile, the signal synthesizer 55 receives the decoded live signal and the decoded time shift signal, which are respectively outputted from the live decoding unit 53 and the time shift decoding unit 54 and then synthesizes the signals. The synthesized signals are displayed on one screen.

At this time, the signal synthesis is performed differently according to the user's request. In other words, when the user requests a reproduction of a current broadcasting, the signal synthesizer 55 synthesizes the signals to display only the incoming real-time live signal on the screen. In this case, instead of the term "synthesis", it can be stated that the live signal is transmitted to the display unit 56 as it is, because the live signal alone is present.

Alternatively, when the user requests a reproduction of a current broadcasting, the signal synthesizer 55 synthesizes the signals to display the live signal and the time shift signal on one screen, specifically on a main screen and a sub-screen, respectively.

Meanwhile, when the user requests a reproduction of a previous broadcasting, the signal synthesizer 55 synthesizes the signals to display the time shift signal and the live signal on one screen, specifically on a main screen and a sub-screen, respectively.

In this manner, according to the user's request, the signal synthesizer 55 can synthesize signals to display only the live signal or display both the live signal and the time shift signal at the same time on one screen.

The signals synthesized by the signal synthesizer 55 are displayed on one screen of the display unit 56.

Figure 4A:
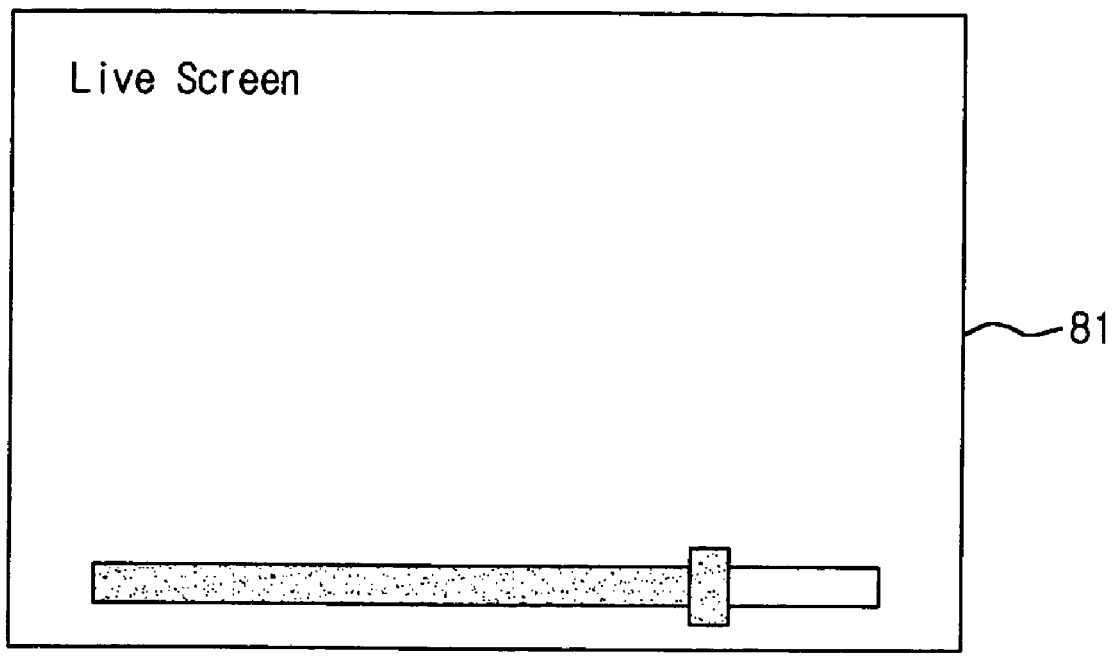
Figure 4B:
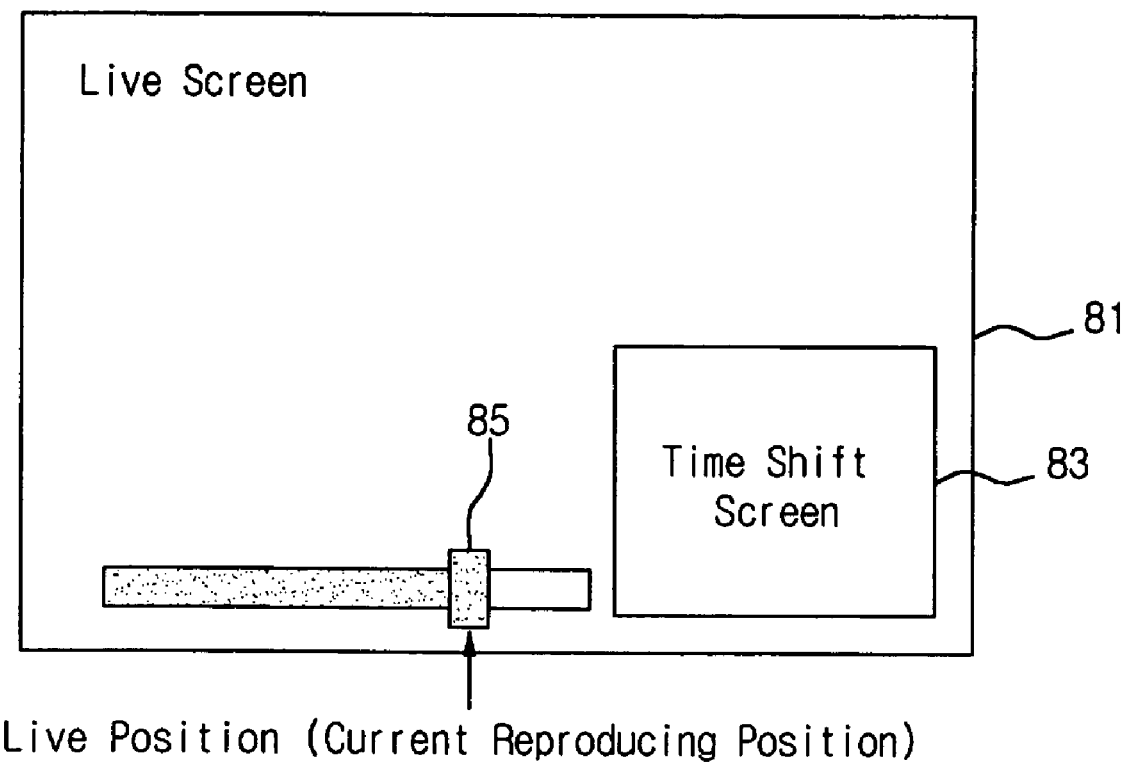

For example, when the user requests a reproduction of the current broadcasting, the signals are displayed on the screens as shown in FIGS. 4A and 4B. FIG. 4A illustrates a screen on which only the live signal is displayed, and FIG. 4B illustrates a screen on which both the live signal and the time shift signal are displayed at the same time. As shown in FIG. 4B, the live signal is displayed on the main screen 81 and the time shift signal is displayed on the sub-screen 83. At this time, a reproducing position of the broadcast signal can be checked through a progress status bar 85. In other words, it can be seen from FIGS. 4A and 4B that a current reproducing position of the progress status bar 85 is identical to a reproducing position of the live signal.

If the user requests the previous broadcasting, the signal is displayed on a screen as shown in FIG. 4C. As shown, the time shift signal and the live signal are displayed on a main screen 87 and a sub-screen 89, respectively. At this time, a current reproducing position of a progress status bar 85 is identical not to a reproducing position of the live signal but to a reproducing position of the time shift signal.

Like this, since the live signal and the time shift signal are displayed on one screen at the same time, the user can switch between the current broadcasting screen and the previous broadcasting screen while viewing the two broadcastings. Accordingly, if unnecessary scenes are displayed in the current broadcasting, the user can view the previous broadcasting. If scenes that the user wants to view are displayed when viewing the previous broadcasting and checking the progress position of the current broadcasting, the user can immediately view the current broadcasting.

Meanwhile, when the user intends to switch to the current broadcasting while viewing the previous broadcasting, a reproducing end position of the time shift signal with respect to the previous broadcasting can be recorded. This can be used as reference information to check a reproducing position of the time shift signal when the user intends to move the reproducing position to the previous viewing position later.

In other words, when the live signal and the time shift signal are displayed at the same time in the time shift mode, if the user requests the screen switch to the current broadcasting while viewing the previous broadcasting (in this case, the time shift signal and the live signal are respectively displayed on the main screen and the sub-screen), an end position at which the previous broadcasting is displayed, that is, a last reproducing position, is recorded and the screen is switched to the current broadcasting screen. In other words, the live signal and the time shift signals are displayed on the main screen and the sub-screen, respectively.

In this manner, if the user does not desire to view the live broadcasting, it is possible to fast switch the current screen to the previous viewing screen, thereby obtaining continuity of the broadcasting viewing.

At this time, if the user again requests the previous broadcasting when the user does not desire to view the current broadcasting, the previous broadcasting is reproduced from the previously recorded end position of the time shift signal. Meanwhile, the time shift signal and the live signal are displayed on the main screen and the sub-screen, respectively.

As described above, in case of switching from the previous broadcasting to the current broadcasting, the reproducing position of the time shift signal with respect to the previous broadcasting is recorded. Therefore, if the screen is switched to the previous broadcasting, the previous broadcasting is reproduced from the recorded reproducing position. As a result, the present invention can solve difficulty of switching from the current broadcasting position to the previous broadcasting because there is no recording about the previous broadcasting.

Hereinafter, an operation of the image recording and reproducing apparatus according to the present invention will be described with reference to the accompanying drawings.

Figure 3:
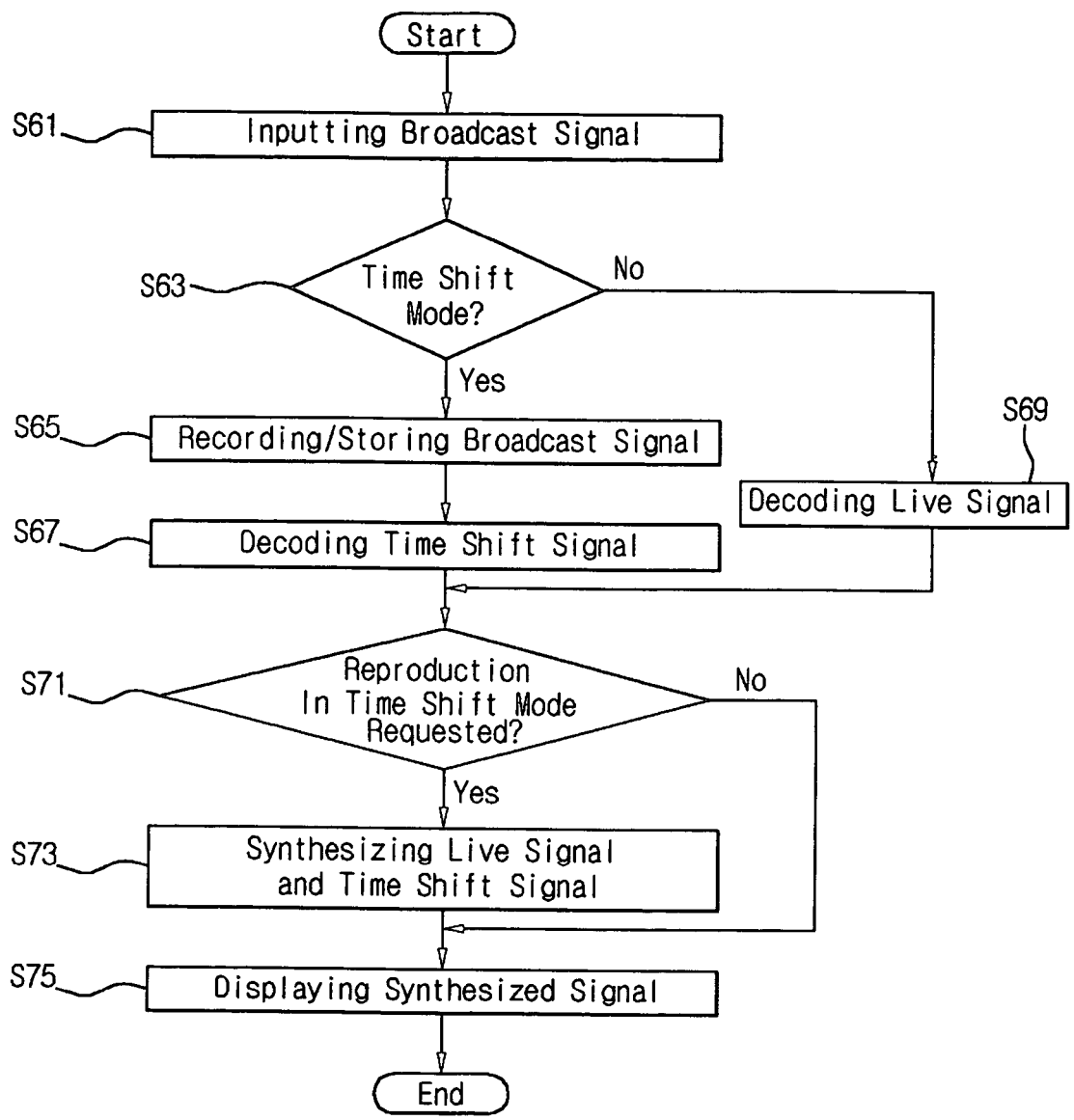
FIG. 3 is a flowchart illustrating a method for simultaneously displaying a live signal and a time shift signal in a time shift mode in the image recording and reproducing apparatus according to a preferred embodiment of the present invention.

FIG. 3 is a flowchart illustrating a method for providing the live signal and the time shift signal at the same time in the time shift mode in the image recording and reproducing apparatus according to a preferred embodiment of the present invention.

Referring to FIG. 3, if the broadcast signal is inputted to the mode setup unit 51 (S61), the mode setup unit 51 determines whether or not the current set mode is the time shift mode (S63).

If the current set mode is not the time shift mode, it means that the current set mode is the reproducing mode. In this case, the broadcast signal is decoded as the live signal by the live decoding unit 53 (S69). The decoded signal is displayed as the live signal on one screen as it is.

On the other hand, if the current set mode is the time shift mode, the broadcast signal is branched into the live signal and the time shift signal. The live signal is inputted to the live decoding unit 53, while the time shift signal is inputted to the recording/storing unit 52 and recorded and stored therein (S65).

The recorded and stored time shift signal is inputted to and decoded by the time shift decoding unit 54 (S67).

The decoded live signal and the decoded time shift signal, which are respectively outputted from the live decoding unit 53 and the time shift decoding unit 54, are synthesized by the signal synthesizer 55. At this time, the signal synthesizer 55 determines whether or not a reproduction in the time shift mode is requested from the user (S71).

If the reproduction in the time shift mode is requested, the signal synthesizer 55 synthesizes the decoded live signal and the decoded time shift signal (S73). In other words, when the user inputs the request for the reproduction of the current broadcasting, the live signal and the time shift signal are synthesized to display the signals on the main screen and the sub-screen, respectively. Alternatively, the signals can be synthesized to display only the live signal on one screen.

In addition, when the user inputs the reproduction of the previous broadcasting, the time shift signal and the live signal are synthesized to display the signals on the main screen and the sub-screen, respectively.

The synthesized signals are displayed on one screen of the display unit 56 (S75). At this time, the live signal and the time shift signal are displayed using Screen Split, PIP or POP.

Accordingly, while viewing the current broadcasting and the previous broadcasting at the same time, the user can switch between the current broadcasting and the previous broadcasting at any time.

Meanwhile, as described above, in case of switching from the previous broadcasting to the current broadcasting, the reproducing end position of the time shift signal with respect to the previous broadcasting is recorded. Therefore, if the user intends to switch the screen to the previous broadcasting again, the previous broadcasting can be reproduced from the recorded reproducing end position. Accordingly, even if the user intends to switch between the current broadcasting and the previous broadcasting at any time, the user can continuously view the broadcasting from its stopped position.

According to the present invention, the current broadcasting and the previous broadcasting with respect to one image contents can be simultaneously displayed on one screen using the multiple decoders.

Further, since the reproducing end position of the previous broadcasting is recorded in the switching from the previous broadcasting to the current broadcasting, the user can continuously view the previous broadcasting from the corresponding reproducing end position in the switching from the current broadcasting to the previous broadcasting.

Accordingly, if scenes that the user wants to view are displayed in the current broadcasting, the user can request the switch to the current broadcasting at any time while viewing the current broadcasting and the previous broadcasting at the same time.

Furthermore, the present invention is expected to improve user's convenience because the switching between the current broadcasting and the previous broadcasting are possible at any time.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image recording and reproducing apparatus, comprising:
a tuner configured to tune a live signal;
a first decoder configured to decode the live signal outputted from the tuner;
a second decoder configured to decode a time shift signal, wherein the time shift signal is a time delayed signal of the live signal outputted from the tuner;
a recording/storing unit configured to record and store the time shift signal;
a signal processing unit configured to process the decoded live signal outputted from the first decoder and the decoded time shift signal outputted from the second decoder; and
a display unit configured to
simultaneously display the processed live signal and the processed time shift signal in accordance with a first and second display mode, and
in response to a user selection, controllably switch between the first and second display mode, wherein, in the first display mode, the display unit is controlled to simultaneously display the processed live signal and the processed time shift signal on a main screen and a sub-screen of the main screen, respectively, wherein, in the second display mode, the display unit is controlled to simultaneously display the processed time shift signal and the processed live signal on the main screen and the sub-screen of the main screen, respectively, wherein the display unit is controlled to display a progress status bar indicating the current reproducing position of the time shift signal compared to the reproducing position of the live signal, wherein the recording/storing unit is configured to record and store a reproducing end position of the time shift signal when the display unit switches from the second display mode to the first display mode, and wherein the signal processing unit is configured to process the decoded time shift signal and decoded live signal to display the time shift signal from the recorded reproducing end position when the display unit again switches from the first display mode to the second display mode.

2. An image recording and reproducing method, comprising:

tuning a live signal using a tuner;

selecting a time shift mode using a mode setup unit;

when a signal is reproduced in the time shift mode, decoding the live signal outputted from the tuner and a time shift signal through first and second decoding units, respectively, wherein the time shift signal is a time delayed signal of the live signal outputted from the tuner;

processing the decoded live signal and the decoded time shift signal;

simultaneously displaying the processed live signal and the processed time shift signal in accordance with a first and second display mode;

in response to a user selection, controllably switching between the first and second display mode, wherein, in the first display mode, the step of simultaneously displaying comprises simultaneously displaying the processed live signal and the processed time shift signal on a main screen and a sub-screen of the main screen, respectively, and wherein, in the second display mode, the step of simultaneously displaying comprises simultaneously displaying the processed time shift signal and the processed live signal on the main screen and the sub-screen of the main screen, respectively; and displaying a progress status bar indicating the current reproducing position of the time shift signal compared to the reproducing position of the live signal; and recording the time shift signal in a recording/storing unit, wherein the step of recording the time shift signal includes recording a reproducing end position of the time shift signal in a recording/storing unit when the display unit switches from the second display mode to the first display, and wherein the second display mode further includes displaying the time shift signal from the recorded reproducing end position when again switching from the first display mode to the second display mode.

* * * * *